United States Patent
Chugh et al.

(10) Patent No.: US 11,679,717 B2
(45) Date of Patent: Jun. 20, 2023

(54) METHOD AND APPARATUS FOR OPERATING A HAPTIC SYSTEM

(71) Applicant: Volvo Car Corporation, Gothenburg (SE)

(72) Inventors: Tushar Chugh, Gothenburg (SE); Fredrik Bruzelius, Gothenburg (SE); David Dahlgren, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 150 days.

(21) Appl. No.: 17/203,106

(22) Filed: Mar. 16, 2021

(65) Prior Publication Data
US 2021/0291731 A1 Sep. 23, 2021

(30) Foreign Application Priority Data

Mar. 17, 2020 (EP) .................................... 20163724

(51) Int. Cl.
*B60Q 1/00* (2006.01)
*B60Q 9/00* (2006.01)
*B62D 1/06* (2006.01)
*B62D 3/12* (2006.01)
*B62D 15/02* (2006.01)
*G06F 3/01* (2006.01)

(52) U.S. Cl.
CPC ............. *B60Q 9/00* (2013.01); *B62D 1/06* (2013.01); *B62D 3/12* (2013.01); *B62D 15/0225* (2013.01); *G06F 3/016* (2013.01)

(58) Field of Classification Search
CPC ... B60Q 9/00; B62D 1/06; B62D 3/12; B62D 15/0225; B62D 6/008; G06F 3/016
See application file for complete search history.

(56) References Cited

U.S. PATENT DOCUMENTS

| | | | | |
|---|---|---|---|---|
| 9,188,223 | B1 * | 11/2015 | Seagraves | F16H 63/42 |
| 9,278,705 | B2 * | 3/2016 | Murata | B62D 1/046 |
| 9,598,098 | B2 * | 3/2017 | Sakurai | B62D 1/04 |
| 2015/0307022 | A1 * | 10/2015 | Nelson | B62D 1/046 |
| | | | | 701/36 |
| 2017/0232998 | A1 | 8/2017 | Ramanujam et al. | |

FOREIGN PATENT DOCUMENTS

| | | |
|---|---|---|
| WO | 2019182496 A1 | 9/2019 |
| WO | 2020050759 A1 | 3/2020 |

OTHER PUBLICATIONS

Extended European Search Report for European Application No. 20163724.6 dated Oct. 12, 2020, 7 pages.

\* cited by examiner

*Primary Examiner* — Toan N Pham
(74) *Attorney, Agent, or Firm* — Amin, Turocy & Watson, LLP

(57) ABSTRACT

The present disclosure relates to a method for operating a haptic system, the haptic system comprising at least one actuator and at least one haptic control device adapted to control the at least one actuator and to provide haptic feedback to a user, the method comprising the steps of: obtaining, from a feedback computational model, modelled feedback data, obtaining, from a feedback estimator, estimated feedback data based on measurement data determined from measurement made on the haptic system, overlaying the modelled feedback data and the estimated feedback data to generate blended feedback data, and providing the blended feedback data to control the haptic feedback to the user.

20 Claims, 3 Drawing Sheets

METHOD AND APPARATUS FOR OPERATING A HAPTIC SYSTEM

CROSS-REFERENCE TO RELATED APPLICATIONS

This application claims priority to EP patent application no. 20163724.6 filed 17 Mar. 2020, entitled "METHOD AND APPARATUS FOR OPERATING A HAPTIC SYSTEM." The entirety of the aforementioned application is hereby incorporated herein by reference.

TECHNICAL FIELD

The present disclosure relates to a method for operating a haptic system, such as a vehicle electric steering system, etc. Further, the disclosure relates to an apparatus for operating a haptic system, a vehicle steering system, a computer program element, and a computer-readable medium.

BACKGROUND ART

Haptic systems may create an experience of touch to a user, by applying forces, torques, motions, or the like. A haptic system may comprise a game controller, a joystick, a steering wheel, or the like, which is the interface to a user of such a haptic system. In at least some haptic systems, there is no direct feedback between the interface to the user and an environment in which the haptic system operates, such as a road on which a vehicle is being driven etc., since there is no mechanical link between the interface to the user and the environment to transmit force, torques, vibrations etc. directly. To create an experience of touch for the user, such as a steering feel, or the like, forces, vibrations, motions, or the like, may be applied to such a haptic system by driving e.g. a feedback actuator. For operating such a haptic system, one approach is controlling the haptic system open-loop, where there is no control error minimization. Another approach is controlling the haptic system closed-loop, which e.g. allows for e.g. error minimization, or the like. For example, when the closed-loop approach is applied to e.g. a vehicle electric steering system, vehicle status signals are typically used to control the feedback for the interface to the user, which may result in a rather unrealistic feedback or an extended response time.

SUMMARY

There may, therefore, be a need to improve a haptic system in terms of giving a more suitable feedback in a haptic system.

The object of the present invention is solved by the subject-matter of the appended independent claims, wherein further embodiments are incorporated in the dependent claims.

According to a first aspect, there is provided a method for operating a haptic system, the haptic system comprising at least one actuator and at least one haptic control device adapted to control the at least one actuator and to provide feedback to a user, the method comprising the steps of:

obtaining, from a feedback computational model, modelled feedback data, obtaining, from a feedback estimator, estimated feedback data based on measurement data determined from measurement made on the haptic system, overlaying the modelled feedback data and the estimated feedback data to generate blended feedback data, and providing the blended feedback data to control the haptic feedback to the user.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

The haptic system may be a stand-alone system, such as a game controller, etc., or may be part of e.g. a higher-level system, such as an x-by-wire system, or the like, where mechanical connections, signals and systems for manual control are replaced by the wiring of electrical, electronic, optoelectronic or optical control signals between e.g. a control device used and an executing actuator.

The actuator may be an electric motor, a servo motor, or the like, wherein the haptic system may comprise one or more actuators. For example, in an Electric Power Assisted Steering (EPAS), there may be one single actuator to control a steering rack and a steering wheel. As a further example, in a Steer-by-Wire (SbW) system, there may be two actuators, one for controlling the steering rack and the other one for controlling the steering wheel. Optionally, the haptic system may further comprise a feedback actuator adapted to generate a force, torque etc. and to drive the haptic control device.

The haptic control device may also be referred to as a user interface and may be formed by or may comprise a game controller, a joystick, a steering wheel, or the like. The haptic control device may be functionally and/or electronically coupled to the at least one actuator.

The method may be implemented in software or in hardware or in software and hardware, and may be adapted to provide a feedback signal for controlling a force, torque, or the like to be applied to the haptic device as a haptic feedback. The method may also be implemented in an apparatus and/or a processing unit, such as an electronic control module.

The step of overlaying the different types of data may also be referred to as combining, sum up or filtering those data.

The terms "estimating" and "modelling" may be understood, for example, in a way that "estimated data" is based to a higher degree or may be completely based on actual data, such as measurement data, than "modelled data". In other words, the modelled data may be referred to as "virtual data", whereas the estimated data may be referred to as "estimated actual data". The modelled data may be computed by use of the computational model in which, for example, the haptic system, such as a vehicle steering system, is at least partially modelled and which is configured to determine or calculate corresponding output data for respective input data. Optionally, the modelled data may rely on only a part of actual data. The estimated data may be calculated by using e.g. an equation of motion, or the like, where no system model is used in the background.

The provided blended feedback data may be used to determine at least one of a force, a torque, a vibration, an angle, speed, an acceleration, etc., to be generated by a feedback controller and/or a feedback actuator coupled to the haptic control device.

The above method may allow for providing a realistic feedback. Further, the response time for providing the feedback may be fast, since the measurement data are obtained from measurements directly made on the haptic system. Further, the feedback data overlay may provide a more suitable feedback to the user.

According to an embodiment, the blended feedback data and/or reference data may be used to drive feedback on the haptic control device. To drive the feedback, at least one feedback actuator may be controlled on the basis of those data. Thus, the feedback to the user may be more suitable, such as more realistic, or the like.

In an embodiment, the method may further comprise determining reference data on the basis of the blended feedback data, and controlling closed-loop the haptic feedback to the user by using the reference data and at least a part of the measurement data as input. The reference data may be understood as the physical value to be output to the user for a given force, torque etc. of the haptic system. Accordingly, the reference data may be a force value, a torque value, vibration parameters, or the like. Thus, a closed-loop control using reference data and measurement data may be implemented. Both, the reference data and the measurement data may be applied to e.g. a feedback controller, which may be configured to drive one or more feedback actuators.

In an embodiment, the feedback data may be a torque reference associated with the at least one actuator. The torque reference may be associated with a vehicle steering system, as one example of the haptic system, and the torque reference may be understood as how much driver torque should be applied for a given force on e.g. a steering rack of the vehicle steering system.

According an embodiment, the feedback data may be an angular position reference associated with the at least one actuator. For example, the angular position reference may comprise an angle and/or a rotational speed and/or a rotational acceleration. Further, the angular position reference may be associated with a vehicle steering system, as one example of the haptic system, and the angular position reference may be understood as how much angle, speed etc. should be applied for a given force on e.g. a steering rack of the vehicle steering system.

According to an embodiment, the method may further comprise performing an error minimization between at least a part of the measurement data and at least a part of the reference data. Thus, a closed-loop control using reference data and measurement data may be implemented.

According to an embodiment, a ratio with which the modelled feedback data and the estimated feedback data with respective proportions are overlaid may be varied. For this, a suitable filter, sum function, or the like, may be used. Therefore, in other words, the respective proportions of the modelled feedback data and the estimated feedback data may be weighted differently depending on a system status and/or system requirements and/or a system environment, etc. For example, if the haptic system is used in or as a vehicle steering system, when driving on a bumpy road, a higher proportion of the modelled feedback data may be used in order not to feedback and/or transmit the actual road conditions to the driver and to provide more comfort for the driver. Likewise, when driving at high vehicle speed, a higher proportion of the estimated feedback data may be used in order to provide feedback that is as realistic as possible.

In an embodiment, the blended feedback data may be generated by use of a weighted filter. The filter may, for example, allow to control the composition of the blended data.

According to an embodiment, the weighted filter may be a weighted sum function to which both the modelled feedback data and the estimated feedback data are applied, and the weight used is variable. In other words, the blended feedback data may be a weighted sum of the modelled feedback data and the estimated feedback data. Thus, the composition of the blended data may be controlled, and/or the feedback may be more or less realistic by weighting the respective part of the blended feedback data more or less. For example, for providing an actual or at least a proximal realistic feedback or behavior.

In an embodiment, a higher proportion of the modelled feedback data and a lower proportion of the estimated feedback data may result in a less realistic haptic feedback, and a lower proportion of the modelled feedback data and a higher proportion of the estimated feedback data may result in a more realistic haptic feedback.

According to an embodiment, the haptic system may be applied to or may form a vehicle steering system, the modelled feedback data is a modelled rack force, the estimated feedback data is a estimated rack force, and the blended feedback data is a blended rack force.

In an embodiment, the measurement data may comprise at least one of: a measured pinion angle, a measured pinion speed, an applied actuator torque, and an applied pinion torque. In such an embodiment, the haptic system may be a part or may form a vehicle steering system, wherein the steering system may be, for example, an Electric Power Assisted Steering System (EPAS) comprising one single actuator to control a steering rack and a steering wheel, the latter may be one example of the haptic control device. Alternatively, the steering system may be a Steer-by-Wire (SbW) system comprising two actuators, one of each controlling the steering rack or the steering wheel, respectively. Since the measurement data mentioned above are acquired directly in or on the haptic system, the response time for providing feedback and/or reference data for this purpose is particularly short.

According to a second aspect, there is provided an apparatus for operating a haptic system. The haptic system comprises at least one actuator and at least one haptic control device adapted to control the at least one actuator and to provide feedback to a user, and the apparatus comprises:
a processing unit configured to:
 obtain, from a feedback computational model, modelled feedback data,
 obtain, from a feedback estimator, estimated feedback data based on measurement data determined from measurement made on the haptic system,
 overlay the modelled feedback data and the estimated feedback data to generate blended feedback data, and
 provide the blended feedback data to control the haptic feedback to the user.

The above apparatus may allow for providing a realistic feedback. Further, the response time for providing the feedback may be fast, since the measurement data are obtained from measurements directly made on the haptic system. Further, the data overlay may provide a more suitable feedback in the haptic system.

According to an embodiment, the haptic system may be at least part of a vehicle steering system. Alternatively, the haptic system may form the vehicle steering system. For example, the vehicle steering system may comprise one or more of: a steering wheel as one example of the haptic control device, a steering column coupled to the steering wheel, a torsion bar, a rack, a pinion, a first actuator for controlling the steering rack and steering wheel, or a first and a second actuator, one of each for controlling the steering wheel or the steering rack, respectively. In such a vehicle steering system, the apparatus may provide a more suitable feedback to the driver.

In an embodiment, the haptic system may further comprise a rack and a pinion, and the reference data is a reference pinion torque or a reference pinion angle.

According to a third aspect, there is provided a vehicle steering system, comprising:
at least one actuator,
at least one haptic control device adapted to control the at least one actuator, and
an apparatus for operating the vehicle steering system according to the second aspect.

The actuator may be configured to control a steering rack and/or a steering wheel of the steering system. Alternatively, there may be at least two actuators, one for controlling the steering rack This vehicle steering system may allow for providing a realistic feedback. Further, the response time for providing the feedback may be fast, since the measurement data are obtained from measurements directly made on the haptic system. Further, the data overlay may provide a more suitable feedback in the haptic system.

According to a fourth aspect, there is provided a computer program element for operating a haptic system, which, when being executed by a processing unit, is adapted to perform the method steps of the first aspect.

According to a fifth aspect, there is provided a computer readable medium having stored the computer program element of the fourth aspect.

The computer program element might therefore be stored on a computer or data processing unit, which might also be an embodiment of the present invention. This data processing unit may be adapted to perform or induce performance of the steps of the method described above. Moreover, it may be adapted to operate the components of the above-described apparatus. The computing unit can be adapted to operate automatically and/or to execute orders of a user. A computer program may be loaded into a working memory of a data processor. The data processor may thus be equipped to carry out the method of the invention. This exemplary embodiment of the invention covers both the computer program that has the intervention installed from the beginning, and a computer program that by means of an update turns an existing program into a program that uses the invention.

A computer program may be stored and/or distributed on a suitable medium, such as optical storage media, or a solid state medium supplied together with, or as a part of other hardware, but may also be distributed in other forms, such as via the Internet or other wired or wireless telecommunication systems. However, the computer program may also be presented over a network like the World Wide Web, and can also be downloaded into the working memory of a data processor from such a network.

According to a further exemplary embodiment of the present invention, a medium for making a computer program element available for downloading is provided, which computer program element is arranged to perform a method according to any one of the previously described embodiments of the invention.

It should be noted that the above embodiments may be combined with each other irrespective of the aspect involved. Accordingly, the method may be combined with structural features and, likewise, the apparatus and the system may be combined with features described above with regard to the method.

These and other aspects of the present invention will become apparent from and elucidated with reference to the embodiments described hereinafter.

BRIEF DESCRIPTION OF DRAWINGS

Exemplary embodiments of the invention will be described in the following with reference to the following drawings.

The figures are merely schematic representations and serve only to illustrate embodiments of the invention. Identical or equivalent elements are in principle provided with the same reference signs.

DESCRIPTION OF EMBODIMENTS

Figure 1A:
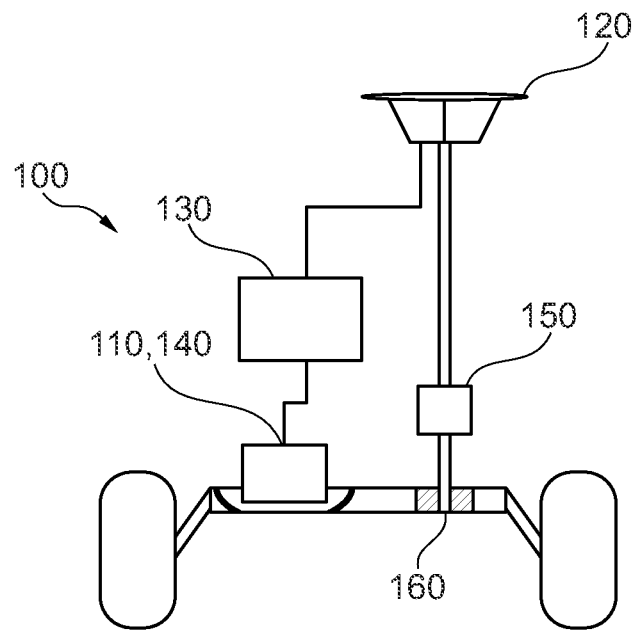
FIG. 1A shows an illustration of an example of a haptic system according to an embodiment.
Figure 1B:
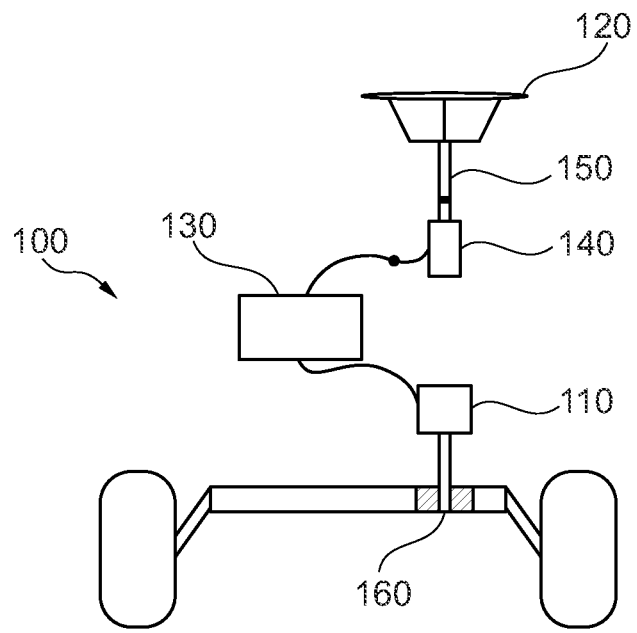
FIG. 1B shows an illustration of another example of a haptic system according to an embodiment.

FIGS. 1A and 1B each show, by way of example, a haptic system 100, which is provided here as a vehicle steering system or a part thereof. Of course, the haptic system 100 may also be provided as or may comprise an exoskeleton, a joystick, or the like. The haptic system 100 comprises at least one actuator 110, which is formed here as an electric motor, a haptic control device 120, which is adapted to control the at least one actuator 110 and formed here as a steering wheel, a data processing unit 130, which is adapted to control feedback to the haptic control device 120, and a feedback actuator 140 (see FIG. 1B), which is adapted to generate a feedback to the haptic control device 120, wherein the feedback comprises at least one of a force, a torque, vibration, etc. In the embodiment according to FIG. 1A, the feedback actuator 140 is built-in in the actuator 110, which is here an Electric Power Assisted Steering (EPAS) motor. In the embodiment according to FIG. 1B, the feedback actuator 140 is formed as a separate electric motor that is functionally coupled to the haptic control device 120.

The haptic system 100 as shown in FIGS. 1A and 1B further comprises a torsion bar 150, and a rack and pinion 160. From a functional perspective, this allows the actuator 110 that drives the rack and pinion 160 to be operated by manipulating the haptic control device 120, in order to adjust the steering angle of the wheels of a vehicle and steer the vehicle.

Figure 2:
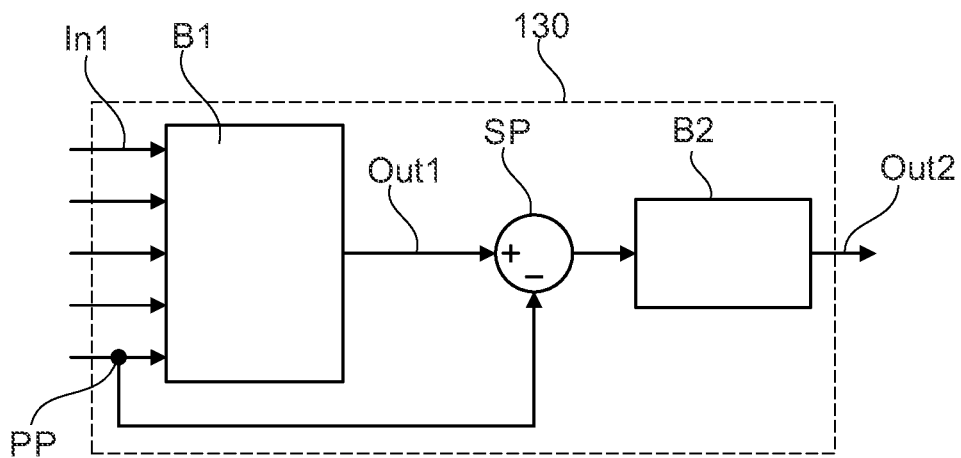
FIG. 2 shows in a block diagram a closed-loop feedback control method to be applied to a haptic system.

FIG. 2 shows in a block diagram a closed-loop feedback control method, which may be applied to the above haptic system 100 and may be carried out by the data processing unit 130. The block diagram comprises a first block B1 adapted to obtain and process several input data In1, e.g. input signals, and to provide first output data Out1, e.g. output signals. The input data In1 comprises one or more of a measured pinion angle, a measured pinion speed, a measured vehicle speed, an applied motor torque, and a measured pinion torque. The first output data Out1 may be a reference pinion torque or a reference angular position, such as a pinion angle. Downstream to the first block B1 the block diagram further comprises a summation point SP to which the first output data Out1 are provided. The block diagram further comprises a pick-up point PP, where at least one of the input data In1 is picked-up for a feedback provided to the summation point SP. For example, the picked-up input data In1 may be the measured pinion torque or the measured pinion angle, depending on the reference that is to be provided. Accordingly, if the output data Out1 is a reference pinion torque, the picked-up input data In1 is the measured pinion torque, and if the output data Out1 is a reference pinion angle, the picked-up input data In1 is the measured pinion angle. The block diagram further comprises a second Block B2 adapted to obtain the result of the summation point SP. For example, the second Block B2 may be a feedback controller, adapted to perform error minimization between the input data In1, which is measurement data obtained from measurements directly made on the haptic system 100, and the output data Out1, which is the reference data determined by block B1. Block B2 provides output data Out2, which is e.g. a motor torque request that may be provided to e.g. the feedback actuator 140 in order to drive the feedback on the haptic control device 120.

Figure 3:
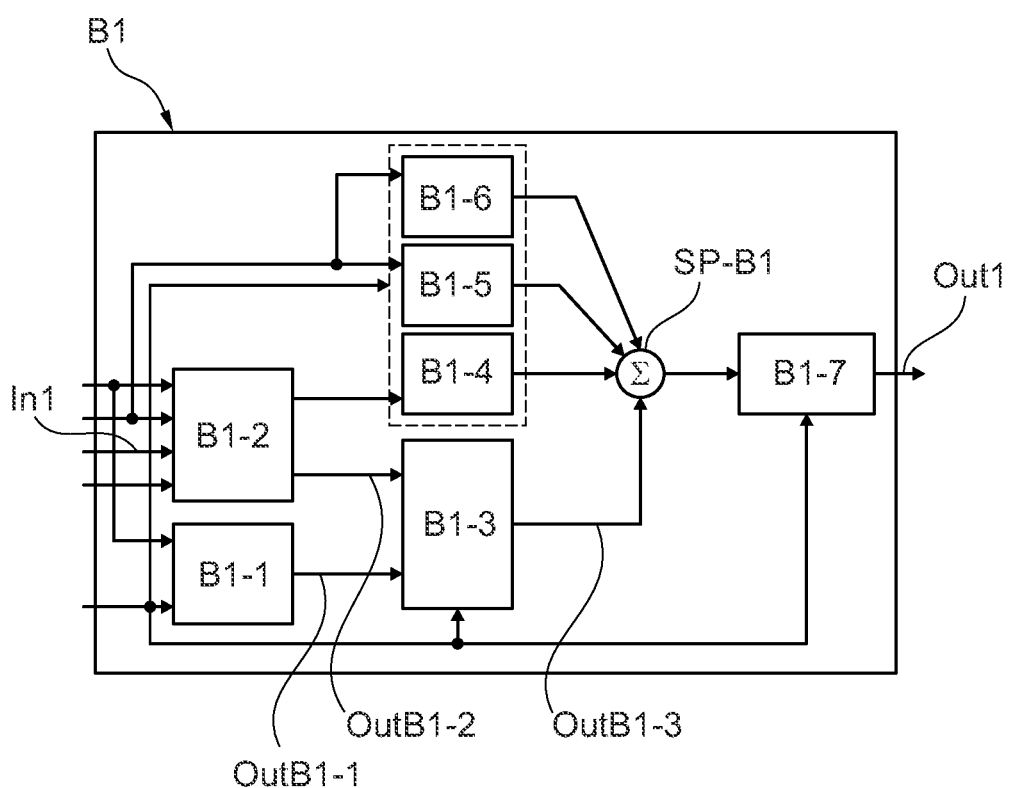
FIG. 3 shows in a block diagram a closed-loop feedback control reference architecture to be applied to a haptic system.
Figure 4:
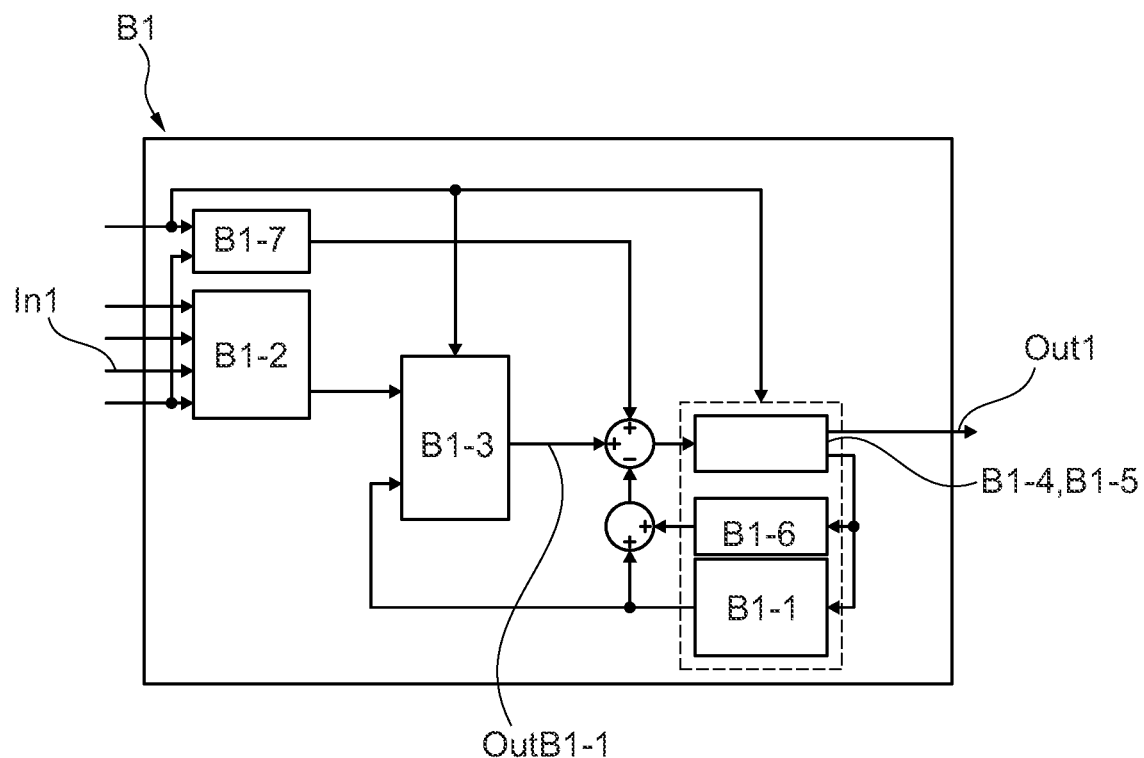
FIG. 4 shows in a block diagram a closed-loop feedback control reference architecture to be applied to a haptic system.

FIGS. 3 and 4 each show in a block diagram a closed-loop control reference architecture according to a respective embodiment. The two architectures differ from each other mainly in that FIG. 3 shows an architecture for providing a torque reference and FIG. 4 shows an architecture for providing a position reference. Referring to FIG. 2, the respective closed-loop control reference architecture forms or is comprised by block B1 as designated in FIG. 2, so that the output data of the respective closed-loop control reference architecture corresponds to the output data Out1 as designated in FIG. 2.

Now referring to FIG. 3, the closed-loop control reference architecture comprises several blocks B1-1 to B1-7, and a summation point SP-B1. Block B1-1 represents a feedback computational model adapted to determine, compute, calculate, generate, etc. and output modelled feedback data OutB1-1, which modelled feedback data here is a modelled rack force. The modelled feedback data OutB1-1 may also be referred to as "virtual" steering feedback data, since the forces are rather hypothetical as these are computed by using a suitable computational model. The feedback computational model B1-1 receives a number of input data, e.g. a measured vehicle speed and a measured pinion angle. The model may at least partly describe the haptic system 100 by using mathematical and/or physical concepts, formulas and/or language, in order to make predictions about the system behavior.

Block B1-2 represents a feedback estimator adapted to determine, compute, calculate, generate, etc. and output estimated feedback data OutB1-2 based on measurement data determined from measurement made on the haptic system 100. The estimated feedback data OutB1-2 here is a estimated rack force, wherein the estimate may also be referred to as a calculation, or the like, and in the best case—if the estimation is accurate—may correspond to the actual rack force. There may be one or more further outputs from Block B1-2, which are not explicitly designated here, such as an estimated rack acceleration, or the like.

Block B1-3 represents a feedback data overlay adapted to overlay the modelled feedback data OutB1-1 and the estimated feedback data OutB1-2 to generate blended feedback data OutB1-3, which is here a blended rack force. Accordingly, the input data of the feedback data overlay B1-3 is the modelled feedback data OutB1-1 and the estimated feedback data OutB1-2. The feedback data overlay may be based on weighted filtering and may use e.g. a weighted sum of the modelled feedback data OutB1-1 and the estimated feedback data OutB1-2. The blended feedback data OutB1-3 is used to control the haptic feedback to the user, which is at least primarily based on the output data Out1, which is here a reference pinion torque. The blended feedback data OutB1-3 is fed to summation point SP-B1.

Blocks B1-4 to B1-6 represent some system variables that may be taken into account in addition to the blended feedback data OutB1-3 and are therefore also fed to the summation point SP-B1. For example, blocks B1-4 to B1-6 may be associated with an active friction force, e.g. a rack friction force $F_{rack,fric}$, an active damping force, e.g. a rack damping force $F_{rack,damp}$, and an active inertia force, e.g. a rack inertia force $F_{rack,inert}$, or the like. It is noted that block B1-4 receives the estimated rack acceleration from block B1-2 as input data. The sum of the several forces of the system forms the total force, e.g. the total rack force.

Block B1-7 represents an inversion function.

For example, the output data Out1, which represents the reference data used in the closed-loop feedback control method according to FIG. 2, may be expressed by the following equation of motion (equation 1):

$$F_{rack,tot} = m_{ref}\ddot{x} + b_{ref}\dot{x} + F_{rack,fric} + F_{rack,eff} = F_{rack,inert} + F_{rack,damp} + F_{rack,fric} + F_{rack,vir}(1-W_f) + F_{rack,est}W_f$$

wherein $F_{rack,tot}$ is the total rack force, $F_{rack,inert}$ is the output of block B1-4, $F_{rack,damp}$ is the output of block B1-5, $F_{rack,fric}$ is the output of block B1-6, $W_f$ is a weighted sum of the modelled feedback data OutB1-1 and the estimated feedback data OutB1-2.

For example, the output data Out1, which is here a reference pinion torque, may be expressed by the following equation (equation 2):

$$M_{pin,ref} = K^{-1}(F_{rack,tot}),$$

wherein $M_{pin,ref}$ is the output data Out1 and $K^{-1}$ is the inversion function provided by block B1-7. Accordingly, the reference torque is finally computed by the inverse of a basic assist function, $K^{-1}$, which is already an existing function that relates to $F_{rack,tot}$ and $M_{pin,ref}$. Basically, it may mean how much driver torque should be applied for a given force on the steering rack in general.

The above force overlay approach may be used to control the feedback to the user, e.g. the driver of a vehicle. For example, if a vehicle is driving on a rough road and the actual road disturbances are not to be felt, $W_f$ may be set to $W_f=0$. As a result, there is only a virtual steering feedback with no actual road response for a comfortable steering feel. On the contrary, if the vehicle is driving with high speed, for a safety critical maneuver, $W_f$ may be set to $W_f=1$, in order to emphasize on the realistic road condition for a faster driver response and/or a lower reaction time to feel the actual vehicle behavior.

Now referring to FIG. 4, another example of the closed-loop control reference architecture will be described. Basically, this closed-loop control reference architecture comprises the same or at least similar blocks B1-1 to B1-6, which will therefore not be described here again. One difference between the architectures of FIG. 3 and FIG. 4 is that in the architecture according to FIG. 4, the output data Out1 is a reference pinion position, and particularly a reference pinion angle. Therefore, block B1-7 can be omitted. As explained above, the total steering rack force $F_{rack,tot}$ for the steering system is the sum of different force components: inertial force $F_{rack,inert}$, damping force $F_{rack,damp}$, Coulomb friction force $F_{rack,fric}$ and external forces coming from the vehicle tires. Using the same equation as explained above in equation 1, and rearranging it gives a second order differential equation, which can be expressed as (equation 3):

$$m_{ref}\ddot{x} = -b_{ref}\dot{x} - F_{rack,vir} + (F_{rack,vir} - F_{rack,est})W_f - F_{rack,fric} + F_{rack,tot} = -b_{ref}\dot{x} - F_{rack,vir} + F_{rack,eff}W_f - F_{rack,fric}K(M_{pin}) = -b_{ref}\dot{x} + F_{rack,dyn},$$

and can be further expressed as (equation 4):

$$\ddot{\theta}_{pin,ref} = \frac{1}{i_{rp}}\ddot{x} = \frac{1}{i_{rp}}\left(-\frac{b_{ref}}{m_{ref}}\dot{x} + \frac{1}{m_{ref}}F_{rack,dyn}\right),$$

wherein equation 4 is a conversion from rack position (or acceleration) variable to pinion angle (or acceleration) variable via the steering rack to pinion gear ratio $i_{rp}$. This results in a position based reference which is mathematically equivalent to a torque control reference, where, however, the causality is basically inverted due to their respective definitions. Again, there would not be any actual road feedback with $W_f=0$ and the virtual rack force model provides a virtual steering feedback. Whereas with $W_f=1$, the entire estimated 'actual' rack force is bypassed with no virtual rack force, to realize the realistic road condition.

Figure 5:
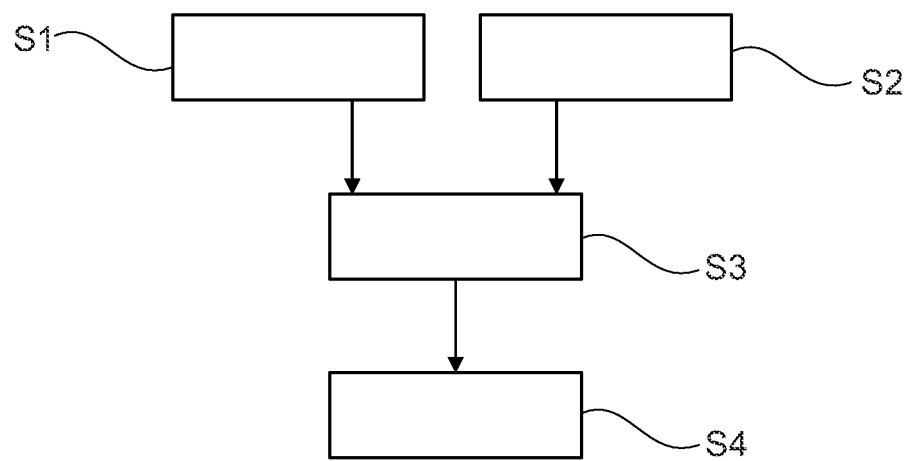
FIG. 5 shows in a flow chart a method for operating a haptic system according to an embodiment.

Referring now to FIG. 5, which shows a flow chart, a method for operating the haptic system 100 will be described in the following.

In a step S1, modelled feedback data is obtained from the feedback computational model, which is represented by block B1-1 as shown in FIGS. 3 and 4. In a step S2, estimated feedback data based on measurement data determined from measurement made on the haptic system 100 is obtained from the feedback estimator, which is represented by block B1-2 as shown in FIGS. 3 and 4. In a step S3, the modelled feedback data and the estimated feedback data to generate blended feedback data are overlayed, e.g. by block B1-3. In a step S4, the blended feedback data OutB1-1 is provided to control the haptic feedback to the user.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS

100 haptic system (e.g. vehicle steering system etc.)
110 actuator
120 haptic control device
130 data processing unit
140 feedback actuator
150 torsion bar
160 rack and pinion

The invention claimed is:

1. A computer-implemented method for operating a haptic system, the haptic system comprising at least one actuator and at least one haptic control device adapted to control the at least one actuator and to provide haptic feedback to a user, the computer-implemented method comprising:
   obtaining, by a system comprising a processor, from a feedback computational model, modelled feedback data;
   obtaining, by the system, from a feedback estimator, estimated feedback data based on measurement data determined from measurement made on the haptic system;
   overlaying, by the system, the modelled feedback data and the estimated feedback data to generate blended feedback data; and
   providing, by the system, the blended feedback data to control the haptic feedback to the user by the haptic system.

2. The computer-implemented method of claim 1, further comprising:
   determining, by the system, reference data based on the blended feedback data; and
   controlling, by the system, the haptic feedback to the user in a closed-loop by using the reference data and at least a part of the measurement data as input.

3. The computer-implemented method of claim 2, further comprising:
   performing, by the system, an error minimization between at least the part of the measurement data and at least a part of the reference data.

4. The computer-implemented method of claim 1, wherein a ratio with which the modelled feedback data and the estimated feedback data with respective proportions are overlaid is varied.

5. The computer-implemented method of claim 4, wherein:
   a higher proportion of the modelled feedback data and a lower proportion of the estimated feedback data results in a less realistic haptic feedback; and
   a lower proportion of the modelled feedback data and a higher proportion of the estimated feedback data results in a more realistic haptic feedback.

6. The computer-implemented method of claim 1, wherein the blended feedback data is generated by use of a weighted filter.

7. The computer-implemented method of claim 6, wherein the weighted filter is a weighted sum function to which both the modelled feedback data and the estimated feedback data are applied.

8. The computer-implemented method of claim 1, wherein:
   the haptic system is applied to or forms a vehicle steering system,
   the modelled feedback data is a modelled rack force,
   the estimated feedback data is an estimated rack force, and
   the blended feedback data is a blended rack force.

9. The computer-implemented method of claim 1, wherein
   the measurement data comprises at least one of: a measured pinion angle, a measured pinion speed, an applied actuator torque or an applied pinion torque.

10. An apparatus for operating a haptic system, the haptic system comprising at least one actuator and at least one haptic control device adapted to control the at least one actuator and to provide haptic feedback to a user, the apparatus comprising:
a processing unit configured to:
obtain from a feedback computational model, modelled feedback data;
obtain from a feedback estimator, estimated feedback data based on measurement data determined from measurement made on the haptic system;
overlay the modelled feedback data and the estimated feedback data to generate blended feedback data; and
provide the blended feedback data to control the haptic feedback to the user by the haptic system.

11. The apparatus of claim 10, wherein
the haptic system is at least part of a vehicle steering system.

12. The apparatus of claim 10, wherein
the haptic system further comprises a rack and a pinion; and
the processing unit is further configured to determine reference data based on the blended feedback data, wherein the reference data comprises at least one of a reference pinion torque or a reference pinion angle.

13. A vehicle steering system, comprising:
at least one actuator,
at least one haptic control device adapted to control the at least one actuator, and
an apparatus for operating the vehicle steering system, wherein the apparatus comprises:
a processing unit configured to:
obtain from a feedback computational model, modelled feedback data;
obtain from a feedback estimator, estimated feedback data based on measurement data determined from measurement made by the at least one haptic control device;
overlay the modelled feedback data and the estimated feedback data to generate blended feedback data; and
provide the blended feedback data to control, via the at least one haptic control device, haptic feedback by the at least one actuator.

14. A haptic device, comprising:
a processor; and
a memory, coupled to the processor, that stores executable instructions that, when executed by the processor, facilitate performance of operations, comprising:
obtaining from a feedback computational model, modelled feedback data;
obtaining estimated feedback data based on measurement data determined from measurement made by the haptic device;
overlaying the modelled feedback data and the estimated feedback data to generate blended feedback data; and
controlling haptic feedback by the haptic device based on the blended feedback data.

15. A non-transitory computer readable medium having instructions stored thereon that, in response to execution, cause a system comprising a processor to perform operations comprising:
obtain, from a feedback computational model, modelled feedback data;
obtain, from a feedback estimator, estimated feedback data based on measurement data determined from measurement made on a haptic system;
overlay the modelled feedback data and the estimated feedback data to generate blended feedback data; and
provide the blended feedback data to control haptic feedback by the haptic system.

16. The non-transitory computer readable medium of claim 15, wherein the operations further comprise:
determine reference data based on the blended feedback data; and
control the haptic feedback in a closed-loop by using the reference data and at least a part of the measurement data as input.

17. The non-transitory computer readable medium of claim 16, wherein the operations further comprise:
perform an error minimization between at least the part of the measurement data and at least a part of the reference data.

18. The non-transitory computer readable medium of claim 15, wherein a ratio with which the modelled feedback data and the estimated feedback data with respective proportions are overlaid is varied.

19. The non-transitory computer readable medium of claim 15, wherein the blended feedback data is generated by use of a weighted filter.

20. The non-transitory computer readable medium of claim 19, wherein the weighted filter is a weighted sum function to which both the modelled feedback data and the estimated feedback data are applied.

* * * * *